(12) United States Patent
Kencharla et al.

(10) Patent No.: US 10,506,622 B1
(45) Date of Patent: Dec. 10, 2019

(54) TRAFFIC COEXISTENCE FOR COLLOCATED TRANSCEIVERS INCLUDING BLUETOOTH TRANSCEIVERS

(71) Applicant: Cypress Semiconductor Corporation, San Jose, CA (US)

(72) Inventors: Raghavendra Kencharla, Bangalore (IN); Rajendra Kumar Gundu Rao, Bangalore (IN); Sri Ramya Thota, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/144,870

(22) Filed: Sep. 27, 2018

Related U.S. Application Data

(60) Provisional application No. 62/690,714, filed on Jun. 27, 2018.

(51) Int. Cl.
*H04W 72/12* (2009.01)
*H04W 16/14* (2009.01)
*H04W 56/00* (2009.01)
*H04W 4/80* (2018.01)
*H04W 84/12* (2009.01)

(52) U.S. Cl.
CPC ......... *H04W 72/1215* (2013.01); *H04W 4/80* (2018.02); *H04W 16/14* (2013.01); *H04W 56/001* (2013.01); *H04W 84/12* (2013.01)

(58) Field of Classification Search
CPC . H04W 72/1215; H04W 56/001; H04W 4/80; H04W 16/14; H04W 84/12
See application file for complete search history.

(56) References Cited

U.S. PATENT DOCUMENTS

| 8,509,201 B2 | 8/2013 | Ashley |
| 8,730,990 B2 | 5/2014 | Ghosh et al. |
| 8,929,259 B2 | 1/2015 | Banerjee et al. |
| 9,167,622 B2 | 10/2015 | Homchaudhuri et al. |
| 9,288,753 B2 | 3/2016 | Sampathkumar |

(Continued)

FOREIGN PATENT DOCUMENTS

WO  2008090509 A2  7/2008

OTHER PUBLICATIONS

Georgios Z. Papadopoulos, "On the Enhancement of IEEE 80211 Overlapping APs Capacity Sharing," Alexander T.E.I. of Theassaloniki, pp. 1-140; 140 pages.

(Continued)

*Primary Examiner* — Shailendra Kumar

(57) ABSTRACT

Systems, methods, and devices enable coexistence of traffic for collocated transceivers. Methods may include generating, using a processing device, a medium access schedule for at least a first transceiver based on a transmission parameter of a second transceiver, the second transceiver being collocated with the first transceiver and sharing a transmission medium with the first transceiver, and the medium access schedule comprising a QuietIE schedule. Methods may also include identifying a plurality of wireless devices communicatively coupled to the first transceiver. Methods may further include transmitting the QuietIE schedule to the plurality of wireless devices, the QuietIE schedule identifying a plurality of quiet periods and a plurality of available periods to the plurality of wireless devices.

20 Claims, 6 Drawing Sheets

(56) References Cited

U.S. PATENT DOCUMENTS

| | | | |
|---|---|---|---|
| 9,300,419 B2 | 3/2016 | Knowles | |
| 9,595,996 B2 | 3/2017 | Yun et al. | |
| 9,839,045 B2 | 12/2017 | Freda et al. | |
| 9,913,178 B2 | 3/2018 | Lee et al. | |
| 2009/0285167 A1* | 11/2009 | Hirsch | H04W 72/1215 |
| | | | 370/329 |
| 2012/0163349 A1 | 6/2012 | Fontaine et al. | |
| 2012/0182976 A1 | 7/2012 | Thoukydides et al. | |
| 2012/0207143 A1* | 8/2012 | Banerjee | H04W 16/14 |
| | | | 370/338 |
| 2013/0225068 A1 | 8/2013 | Kiminki et al. | |
| 2016/0373161 A1* | 12/2016 | Yun | H04W 72/085 |
| 2018/0242339 A1* | 8/2018 | Choudhary | H04W 72/1215 |

OTHER PUBLICATIONS

International Search Report for International application PCT/US/19/31376 dated Jun. 20, 2019.

Written Opinion of the International Searching Authority for International application PCT/US/19/31376 dated Jun. 20, 2019.

* cited by examiner

TRAFFIC COEXISTENCE FOR COLLOCATED TRANSCEIVERS INCLUDING BLUETOOTH TRANSCEIVERS

CROSS-REFERENCE TO RELATED APPLICATIONS

This application claims the benefit under 35 U.S.C. § 119(e) of U.S. Provisional Patent Application No. 62/690,714, filed on Jun. 27, 2018, which is incorporated by reference herein in its entirety for all purposes.

TECHNICAL FIELD

This disclosure generally relates to collocated transceivers, and more specifically, to implementation of coexistence of traffic associated with such collocated transceivers.

BACKGROUND

Various devices may include transceivers configured to transmit data in accordance with various wireless communications protocols. For example, transceivers may utilize Wi-Fi communications protocols, or may use Bluetooth communications protocols. In some cases, multiple transceivers may be implemented within a single device, and may share other system resources, such as transmission media, and components associated with such transmission media such as antenna. Accordingly, multiple transceivers may share a single antenna. However, such transceivers remain limited in their ability to share such transmission medium resources efficiently and effectively.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Various devices may include one or more transceivers that share transmission media. For example, a single device may include a Bluetooth transceiver as well as a wireless local area network transceiver (WLAN) transceiver. Such transceivers may share, at least in part, a common wireless medium of a 2.4 GHz band. Moreover, such transceivers may also share hardware associated with such a transmission medium, such as an antenna. Accordingly, coexistence techniques may be implemented so that the different transceivers sharing the same transmission medium may both utilize the transmission medium without interfering with each other's communications. Some coexistence techniques utilize the transmission of CTS-to-Self frame or management frame with every period of a transmission. In such techniques, such a frame is sent with each duty cycle and occupies a large amount of the available transmission traffic and might not be entirely effective in protecting transmitted traffic.

Various embodiments are disclosed herein that provide collocated transceivers within a collocated device to share a transmission medium in an efficient and effective manner. As will be discussed in greater detail below, collocated devices may include different transceivers that share a transmission medium. As will be discussed in greater detail below, embodiments disclosed herein utilize the generation and transmission of a medium access schedule, that may be a QuietIE based schedule, to facilitate coexistence between different transceivers that share a transmission medium by, for example utilizing the same transmission band. Accordingly, the activity of downstream devices and the first transceiver may be configured and synchronized based on transmission characteristics of the second transceiver, and this may be accomplished using a single initial beacon frame. In this way, the number of frames utilized for protection and coexistence of collocated transceivers is reduced, and the amount of transmitted data utilized to ensure such protection and coexistence is reduced. Moreover, the efficacy of such protection and coexistence is increase as well. Various embodiments are now discussed in greater detail.

Figure 1:
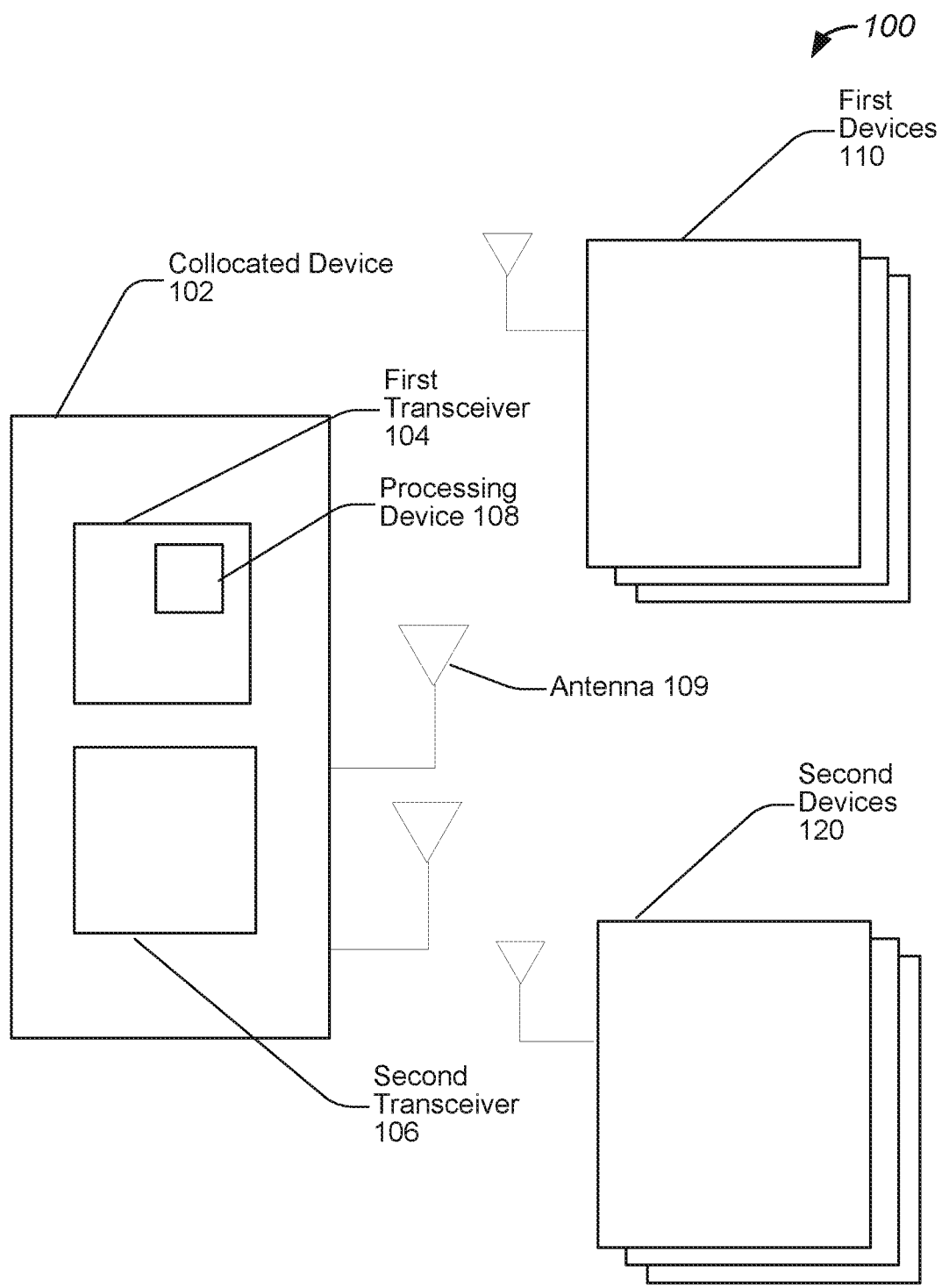
FIG. 1 illustrates an example of a system that includes collocated transceivers, configured in accordance with some embodiments.

FIG. 1 illustrates an example of a system that includes collocated transceivers, configured in accordance with some embodiments. As will be discussed in greater detail below, devices disclosed herein may include multiple transmission devices, such as transceivers, that may share a transmission medium. Accordingly, devices as disclosed herein are configured to implement coexistence of such transceivers in an efficient manner that greatly reduces the amount of transmission overhead utilized to implement such coexistence and sharing of the transmission medium.

In various embodiments, system 100 includes collocated device 102. As discussed above, collocated device 102 is a device that is configured to include multiple collocated transmission devices that may share a common transmission medium. For example, collocated device 102 may include first transceiver 104 and second transceiver 106. In various embodiments, first transceiver 104 and second transceiver 106 each include a transmitter and a receiver. As will be discussed in greater detail below, first transceiver 104 may include a first transmitter and receiver compatible with a first communications protocol, and second transceiver 106 may include a second transmitter and receiver compatible with a second communications protocol. Both first transceiver 104 and second transceiver 106 are configured to transmit and receive data via antenna 109 which is configured to transmit and receive wireless communications signals. Accordingly, collocated device 102 is configured such that network traffic associated with first transceiver 104 and second transceiver 106 shares the utilization of antenna 109.

As will be discussed in greater detail below with reference to FIG. 2, first transceiver 104 may include a processing device, such as processing device 108, that is configured to schedule network traffic to implement coexistence of data traffic for first transceiver 104 and second transceiver 106. More specifically, processing device 108 may be configured to determine and generate a schedule utilized send traffic associated with first transceiver 104. Such a schedule may be determined and generated based on a protocol utilized by second transceiver 106, and the schedule may be implemented utilizing a QuietIE parameter of a transmitted frame. Accordingly, coexistence may be implemented by generating a QuietIE schedule that is transmitted in a beacon frame, and is synchronized to periodic activity of second transceiver 106. Additional details of the scheduling of such traffic are discussed in greater detail below with reference to FIG. 2.

As will also be discussed in greater detail below with reference to FIG. 2, first transceiver 104 may be a WLAN device, and second transceiver 106 may be a Bluetooth device. Accordingly, in some embodiments, collocated device 102 includes a WLAN transceiver and a Bluetooth transceiver that share a particular transmission medium that utilizes shared hardware components, such as antenna 109. Moreover, the schedule generated by processing device 108 for the WLAN transceiver is determined based, at least in part, on the Bluetooth protocol utilized by the Bluetooth transceiver. While various embodiments disclosed herein describe second transceiver 106 as being compatible with a Bluetooth protocol, it will be appreciated that other implementations of second transceiver 106 are contemplated and disclosed herein. For example, second transceiver 106 may be compatible with other protocols such as Bluetooth Low Energy (BLE) or cellular protocols such as a Global System for Mobile Communications (GSM) protocol.

In various embodiments, collocated device 102 is configured as a software enabled access point (SoftAP). Accordingly, in some embodiments, collocated device 102 is configured to function as a wireless access point that handles wireless communication and routing of network traffic with one or more other wireless devices, such as first plurality of devices 110 and second plurality of devices 120 discussed in greater detail below and also with reference to, for example, FIG. 3. In some embodiments, collocated device 102 is configured as a client device, or a station (STA), as will also be discussed in greater detail below with reference to, for example, FIG. 4.

In some embodiments, system 100 includes first plurality of devices 110 which may be devices configured to transmit and receive wireless network traffic utilizing a transmission modality similar to that of first transceiver 104. For example, if first transceiver 104 is a WLAN transceiver, first plurality of devices 110 may be WLAN devices. In a particular example, first plurality of devices 110 may include devices such as mobile phones and mobile devices, laptops and computing devices, as well as any other suitable wireless-enabled device such as smart home devices. Accordingly, first plurality of devices 110 is configured to communicate with first transceiver 104.

System 100 also includes second plurality of devices 120 which may be devices configured to transmit and receive wireless network traffic utilizing a transmission modality similar to that of second transceiver 106. For example, if second transceiver 106 is a Bluetooth transceiver, second plurality of devices 120 may be Bluetooth devices. In a particular example, second plurality of devices 120 may also include devices such as mobile phones and mobile devices, as well as laptops and computing devices. Moreover, second plurality of devices 120 may include various smart devices, such as wearable devices. Accordingly, second plurality of devices 120 is configured to communicate with second transceiver 106.

In various embodiments, first transceiver 104 and second transceiver 106 may be located on a same chip. Accordingly, the transceivers may be implemented as integrated circuits on a same die or substrate. In some embodiments, first transceiver 104 and second transceiver 106 may be implemented on different dies or chips. Accordingly, first transceiver 104 and second transceiver 106 may be implemented in different in different integrated circuits or processing devices. Accordingly, while FIG. 1 illustrates one example, of how first transceiver 104 and second transceiver 106 may be implemented, it will be appreciated that collocated device 102 as well as first transceiver 104 and second transceiver 106 may be configured in any of the ways described above and disclosed herein.

Moreover, while FIG. 1 and FIG. 2 discussed in greater detail below describe the operation of first transceiver 104 and second transceiver 106 with reference to antenna 109, it will be appreciated that collocated device 102 may include multiple antennas. Accordingly, first transceiver 104 may be coupled to a first antenna, and second transceiver 106 may be coupled to a second antenna, and the access to and utilization of such antennas may be configured as disclosed herein. In this way, access to the transmission medium may be controlled despite the use of multiple antennas.

Figure 2:
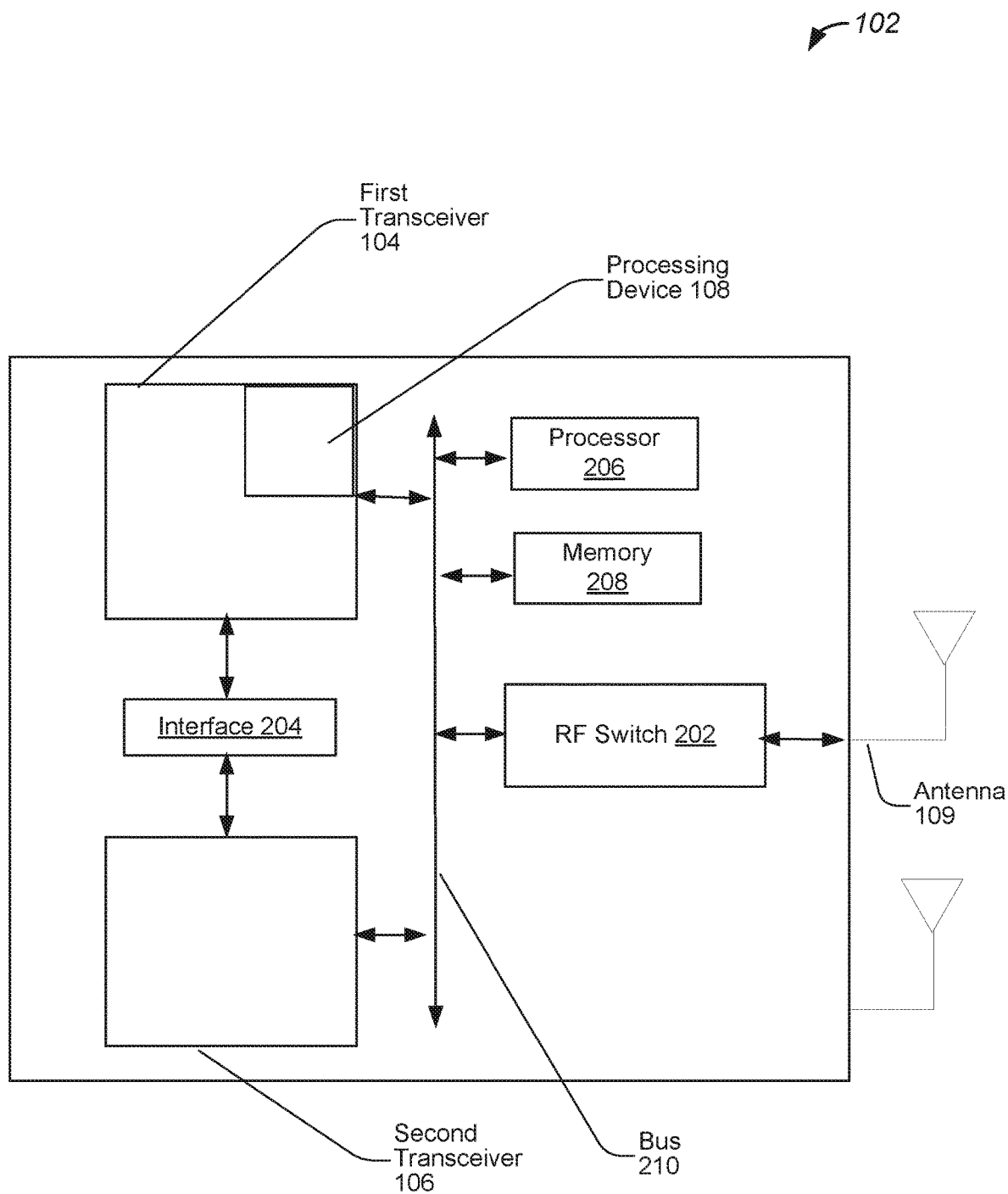
FIG. 2 illustrates an example of a device that includes collocated transceivers, configured in accordance with some embodiments.

FIG. 2 illustrates an example of a device that includes collocated transceivers, configured in accordance with some embodiments. As discussed above, devices disclosed herein may include multiple transmission devices, such as transceivers, that may share a transmission medium. As also discussed above, a collocated device, such as collocated device 102, may include one or more transceivers, such as first transceiver 104 and second transceiver 106 that share access to a transmission medium and share hardware components, such as antenna 109.

As noted above, first transceiver 104 and second transceiver 106 may be different types of transceivers that utilize different transmission protocols. For example, first transceiver 104 may be a WLAN transceiver that is configured to utilize a Wi-Fi transmission protocol in accordance with a suitable 802.11 specification. Moreover, second transceiver 106 may be a Bluetooth transceiver that is configured to utilize Bluetooth transmission protocols. Accordingly, second transceiver 106 may be configured to have a specific protocol issuing particular requests, such as Bluetooth sync events or requests, at particular times as designated by the Bluetooth transmission protocol.

In various embodiments, processing device 108, may include a packet traffic arbiter configured to manage data packets associated with first transceiver 104, and processing device 108 is configured to generate the schedule. More specifically, processing device 108 is configured to generate a QuietIE schedule based on a transmission parameter of second transceiver 106. In various embodiments, a transmission parameter may refer to particular feature or characteristic of a transmission protocol, such as a period, frequency, amplitude, duty cycle, sequence of data values, or any other suitable unique characteristic or identifier associated with the transmission protocol.

Thus, according to some embodiments, processing device 108 may identify periods of activity of second transceiver 106 based on the transmission protocol of second transceiver 106. In this example, second transceiver 106 is a Bluetooth transceiver that utilizes an enhanced synchronous connection-oriented (eSCO) Bluetooth protocol. Such a protocol may have specific times at which sync requests are made, and at which Bluetooth traffic begins and ends. Accordingly, processing device 108 is configured to query second transceiver 106 to determine when such traffic is expected. Processing device 108 is further configured to generate a QuietIE schedule based on the results of such a query. The generated QuietIE schedule may be generated based on an identification or estimation of times at which traffic of second transceiver 106 is expected and not expected, such as when there is Bluetooth traffic, and when there is no Bluetooth traffic. In various embodiments, such parameters or properties may be queried, observed, or inferred. For example, Bluetooth traffic may have a particular carrier frequency with a particular duty cycle within that frequency. Based on such parameters, processing device 108 may determine when second transceiver 106 is not active and when there is no Bluetooth traffic. Accordingly, the generated QuietIE schedule is configured based on an indication of when transmission is possible by first transceiver 104, such as when second transceiver is not transmitting. More specifically, the Quite IE schedule may be synced to particular features of second transceiver 106, such as Bluetooth sync events. Thus, the generated QuietIE schedule may be generated based on times at which the transmission medium is available for first transceiver 104, as identified based on the transmission parameter of second transceiver 106.

In various embodiments, the QuietIE schedule may identify periods when the transmission medium is quiet and absent, or periods when it is available and present. Accordingly, an access point generating the Quite IE schedule may include the Quite IE schedule in a beacon frame that is transmitted to downstream client devices, and the QuietIE schedule may identify when the access point is quiet and when the access point is available. In various embodiments, such downstream client devices may also be referred to herein as stations. In this way, operation of first transceiver 104 as well as downstream devices in communication with first transceiver 104 are configured to implement traffic in accordance with quiet and available times that are determined based on the estimated Bluetooth traffic activity of second transceiver 106.

Furthermore, processing device 108 is configured to generate the first and second control signals in accordance with the generated QuietIE schedule. For example, during an enabled time in which there is no expected Bluetooth traffic, and traffic is allowed for first transceiver 104, which may be a WLAN transceiver which appears as present when enabled, first control signal may enable coupling between antenna 109 and first transceiver 104, and second control signal may disable coupling between antenna 109 and second transceiver 106. Moreover, during a quiet time or disabled time in which there is expected Bluetooth traffic and traffic is not allowed for first transceiver 104, first control signal may disable coupling between antenna 109 and first transceiver 104, and second control signal may enable coupling between antenna 109 and second transceiver 106. Additional details regarding such signals will be discussed in greater detail below with reference to FIGS. 3 and 4.

In various embodiments, collocated device 102 further includes RF switch 202 which is coupled to antenna 109, and is configured to enable and disable coupling between the transceivers and antenna 109. For example, a first control signal may control coupling/decoupling between first transceiver 104 and antenna 109. Moreover, a second control signal may control coupling/decoupling between second transceiver 106 and antenna 109. In various embodiments, such control signals are generated by processing device 108.

In some embodiments, collocated device 102 further includes interface 204 which provides a direct communicative interface between first transceiver 104 and second transceiver 106. In various embodiments, collocated device 102 also includes processor 206 and memory 208 which are configured to handle one or more processing operations associated with first transceiver 104, second transceiver 106, interface 204, and RF switch 202, and store data such as state data and backup data. Moreover, communications between components of collocated device 102 may be facilitated by bus 210.

Figure 3:
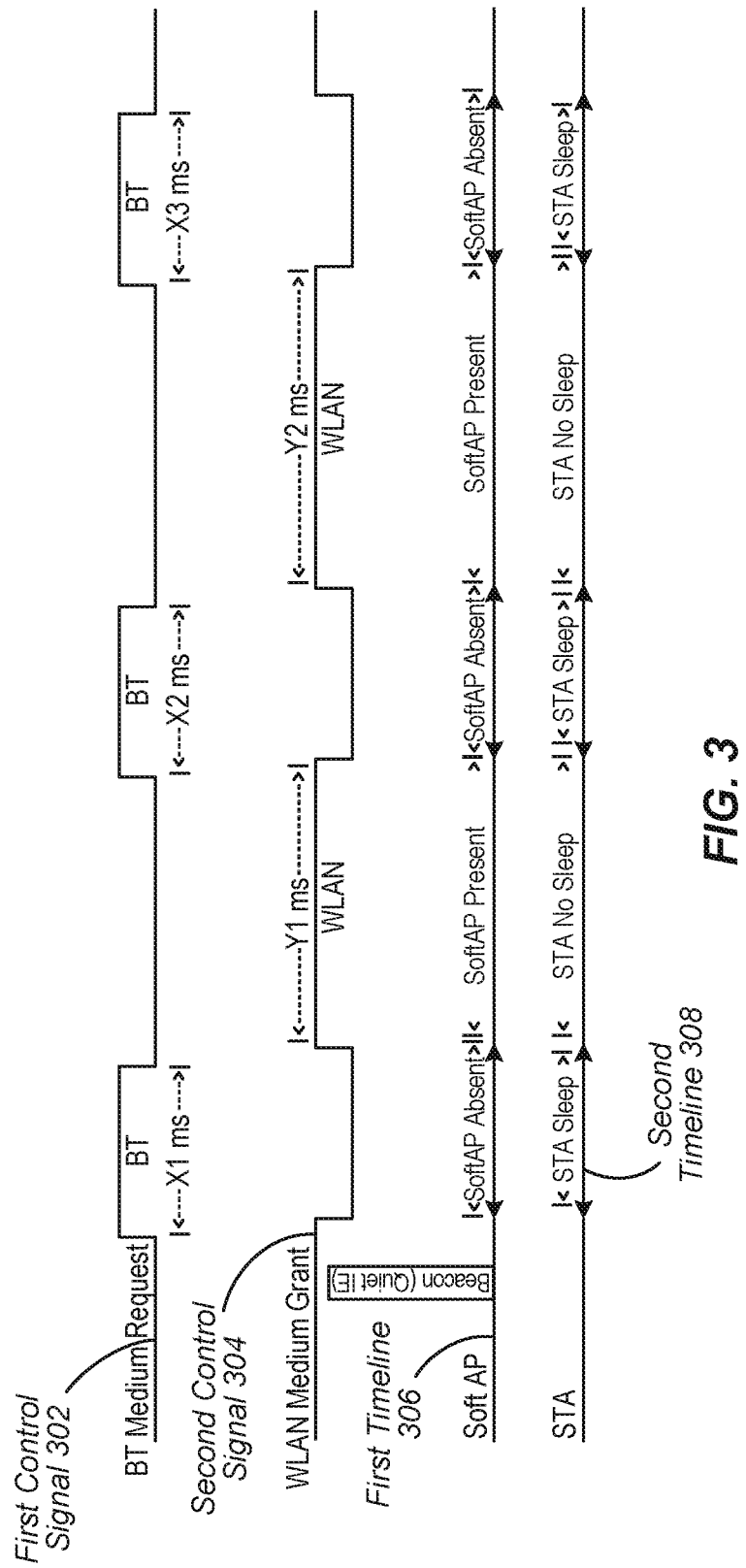
FIG. 3 illustrates an example of a first timing diagram, configured in accordance with some embodiments.

FIG. 3 illustrates an example of a first timing diagram, implemented in accordance with some embodiments. As discussed above, various control signals may be generated by processing device 108. Moreover, such control signals may be grant signals that are configured to grant or deny access of a transceiver to a shared transmission medium. For example, first control signal 302 may be configured to grant or deny transmission medium access to first transceiver 104 based, at least in part, on the QuietIE schedule, and may be generated by processing device 108. Moreover, second control signal 304 may be configured to grant or deny transmission medium access to second transceiver 106 based, at least in part, on the QuietIE schedule, and may be provided from processing device 108 to second transceiver 106.

In another example, such control signals may be utilized to enable and disable coupling between first transceiver 104 and antenna 109. In this way, first control signal 302 may be utilized as a transmission medium grant signal for first transceiver 104. Similarly, second control signal 304 may be utilized to enable and disable coupling between second transceiver 106 and antenna 109. In this way, second control signal 304 may be utilized as a transmission medium grant signal for second transceiver 106.

First timeline 306 illustrates an example of states associated with first transceiver 104. For example, when first transceiver 104 is not granted access to the transmission medium, first transceiver 104 may be absent or quiet. Moreover, when first transceiver 104 is granted access to the transmission medium, first transceiver 104 is present or available. First timeline 306 also illustrates the initial transmission of a beacon frame that includes the QuietIE schedule. In various embodiments, the collocated device including first transceiver 104 and second transceiver 106 is configured as an access point that is managing the coexistence of first transceiver 104 and second transceiver 106 in the transmission medium. In such an example, as shown in first timeline 306, the coexistence between first transceiver 104 and second transceiver 106 is implemented using a single beacon frame. Furthermore, as shown in second timeline 308, a downstream client device may implement the transmitted QuietIE schedule to synchronize its quiet and active times to the generated schedule. Accordingly, the downstream client device may be quiet when first transceiver 104 is not granted access to the transmission medium, and the downstream client device may be in active when first transceiver 104 is granted access to the transmission medium.

Figure 4:
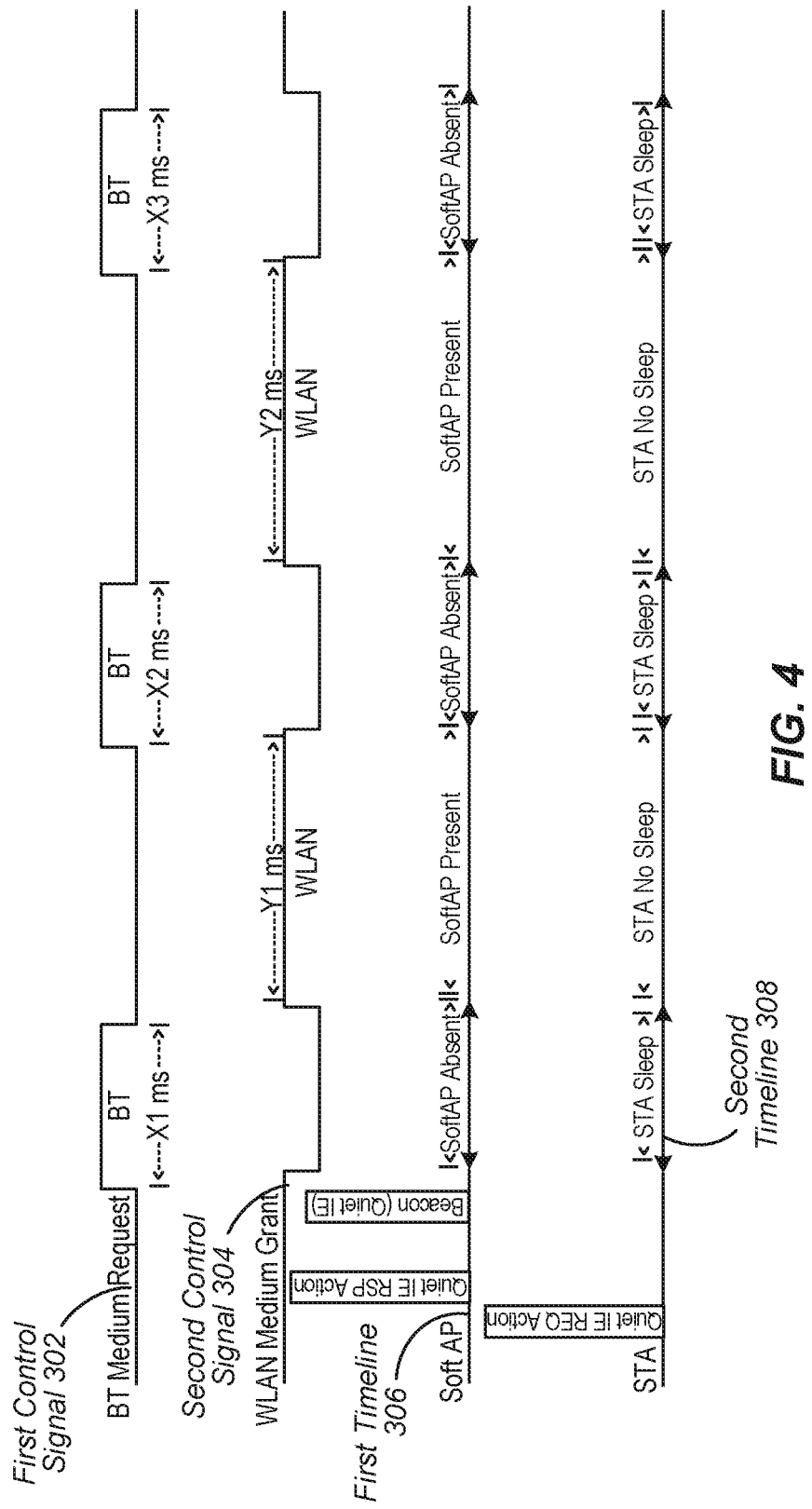
FIG. 4 illustrates an example of a second timing diagram, configured in accordance with some embodiments.

FIG. 4 illustrates an example of a second timing diagram, implemented in accordance with some embodiments. As similarly discussed above, control signals, such as first control signal 302 and second control signal 304 may be generated by processing device 108 and utilized to enable and disable coupling between first transceiver 104 and antenna 109 as well as to enable and disable coupling between second transceiver 106 and antenna 109.

As also shown in FIG. 4, first timeline 306 illustrates an example of states associated with first transceiver 104, and second timeline 308 illustrates how a downstream client device may implement the transmitted QuietIE schedule to synchronize its quiet and active times to the generated schedule. FIG. 4 further illustrates how a request frame may be issued by the downstream device to initiate the generation of the QuietIE schedule. More specifically, collocated device 102 may be a downstream device, such as a client device or station, that is managing the coexistence of first transceiver 104 and second transceiver 106 in the transmission medium. Accordingly, when configured in this way collocated device 102 may transmit a QuietIE request frame to an access point. In this example, the access point may generate a QuietIE response action which may include the generation of the QuietIE schedule as described above. The QuietIE schedule may then be distributed in a beacon frame to all downstream client devices. In this way, the generation of a QuietIE schedule may be responsive to a request from a client device when a client device is managing the coexistence of first transceiver 104 and second transceiver 106 in the transmission medium.

Figure 5:
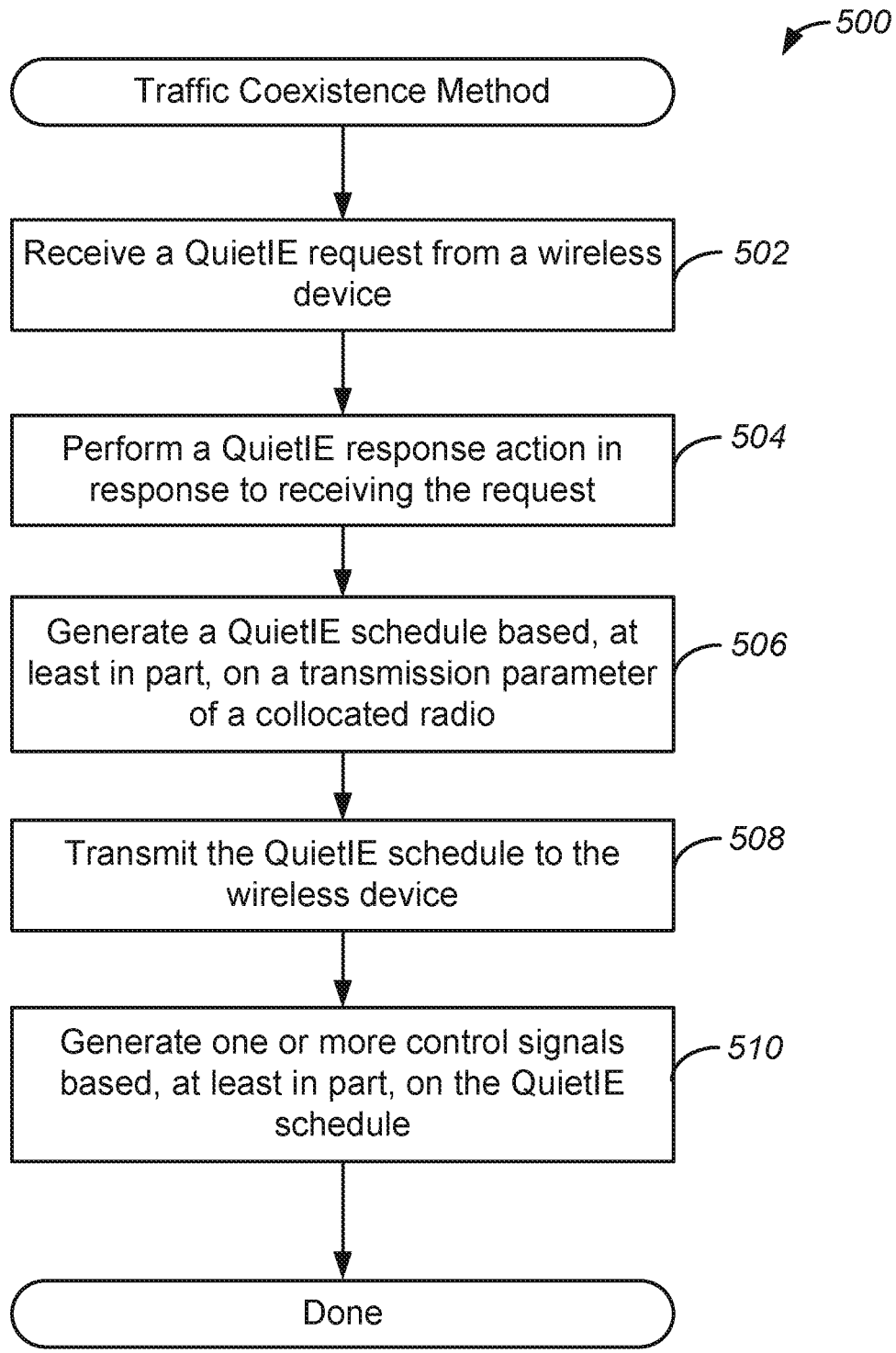
FIG. 5 illustrates flow chart of an example of a method for implementing coexistence of traffic for collocated transceivers in accordance with some embodiments.

FIG. 5 illustrates flow chart of an example of a method for implementing coexistence of traffic for collocated transceivers in accordance with some embodiments. As discussed above, the implementation of coexistence of traffic as disclosed herein may utilize the transmission of far fewer frames, and result in reduction of transmission overhead associated with such coexistence of traffic.

Accordingly, method 500 may being with operation 502 during which a QuietIE request action may be issued. As discussed above, the QuietIE request may be generated by a downstream client device which may be a station. As noted above, such a downstream client device may, for example, be a WLAN device that is in communication with first transceiver 104.

Method 500 may proceed to operation 504 during which a QuietIE response action may be performed. In various embodiments, the QuietIE response action may include the transmission of a QuietIE response frame.

Method 500 may proceed to operation 506 during which a QuietIE schedule may be generated. As discussed above, the QuietIE schedule may be generated based on the transmission parameter of another collocated transceiver, such as second transceiver 106. In this way, the QuietIE schedule may be generated based on one or more characteristics of the transmission protocol of second transceiver 106. For example, the QuietIE schedule may be generated for a collocated WLAN transceiver and downstream STAs, and such QuietIE schedule may be generated based, at least in part, on a Bluetooth protocol implemented by a collocated Bluetooth transceiver.

Method 500 may proceed to operation 508 during which the QuietIE schedule may be transmitted. As noted above, the QuietIE schedule may be included in a beacon frame that is transmitted to all downstream devices. In this way, the downstream devices may receive the QuietIE schedule, and synchronize their quiet and active times based on the expected activity of second transceiver 106. Moreover, as similarly discussed above, the transmission and implementation of the QuietIE schedule enables the implementation of coexistence of the collocated transceivers utilizing the single beacon frame, and request frame if utilized, as opposed to a CTS-to-Self frame or management frame with every transmission.

Method 500 may proceed to operation 510 during which one or more control signals may be generated. As also described above, control signals, such as the first and second control signals may be generated and implemented based on the identified times underlying the QuietIE schedule. Accordingly, the first and second control signals may be generated and implemented to enable utilization of the transmission medium and associated hardware that may include, for example, antenna 109, in a manner that in consistent with the generated QuietIE schedule.

Figure 6:
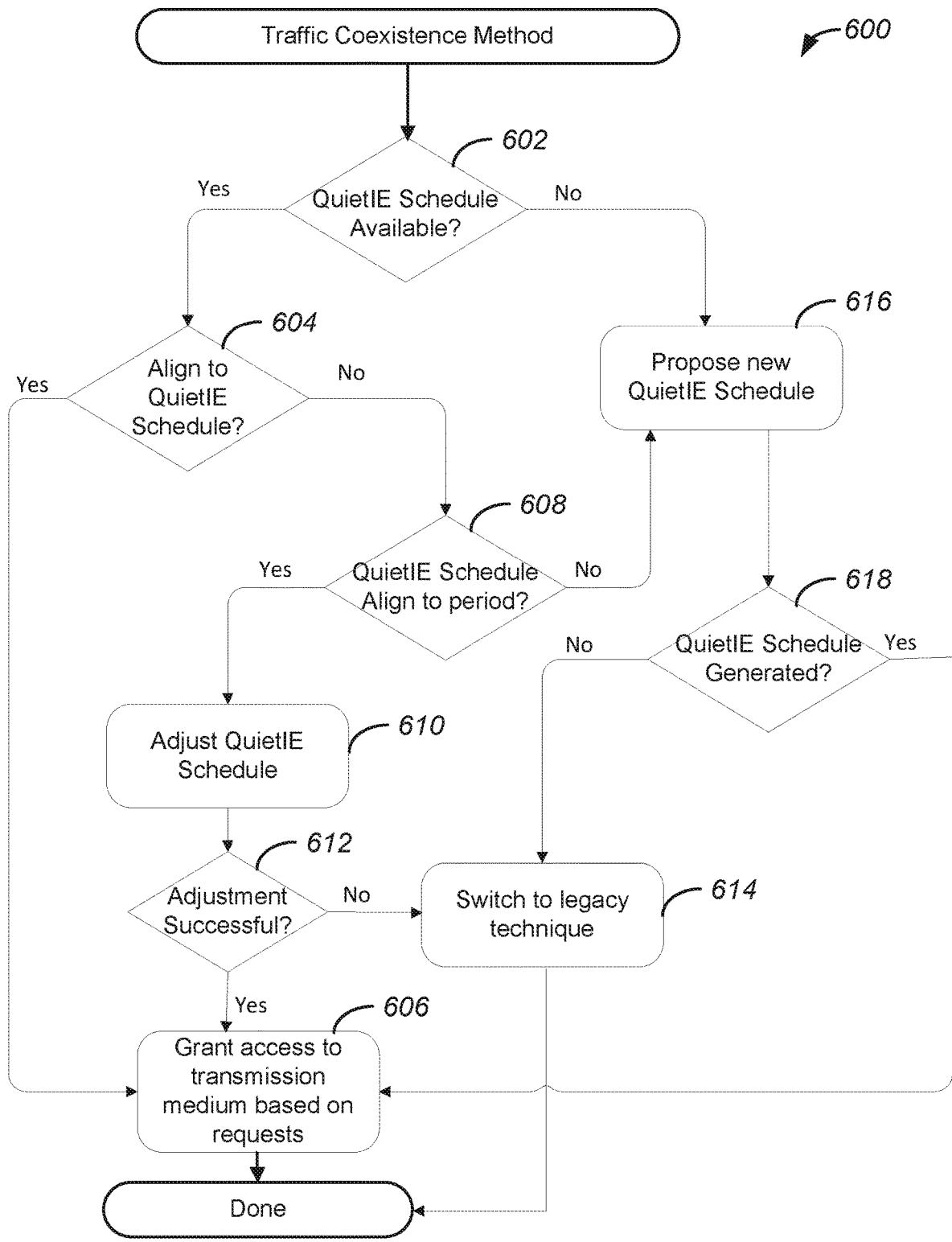
FIG. 6 illustrates flow chart of another example of a method for implementing coexistence of traffic for collocated transceivers in accordance with some embodiments.

FIG. 6 illustrates flow chart of another example of a method for implementing coexistence of traffic for collocated transceivers in accordance with some embodiments. As will be discussed in greater detail below, the implementation of coexistence of traffic as disclosed herein may utilize the transmission of far fewer frames, and may also implement legacy techniques when the implementation of a QuietIE schedule is not feasible.

Accordingly, method 600 may being with operation 602 during which it may be determined if a QuietIE schedule is available. Such a determination may be made based on whether or not a QuietIE schedule is stored in a memory of a collocated device, or based on one or more indicators or identifiers that are configured to identify the availability of a QuietIE schedule. In various embodiments, if a QuietIE schedule is available, method 600 may proceed to operation 604.

During operation 604, it may be determined if a transceiver, such as a second transceiver, may be aligned with the QuietIE schedule. In various embodiments, such a determination may be made based on a comparison of the QuietIE schedule with parameters or characteristics of the transmission protocol of the second transceiver. For example, available periods and quiet periods may be compared against parameters, such as duty cycle and period, of the transmission protocol of the second transceiver, and it may be determined if it is possible to align the second transceiver with the available periods and quiet periods given those parameters or characteristics. If it is determined that alignment is possible, method 600 may proceed to operation 606 during which the second transceiver may be granted access to the transmission medium based on requests issued by the second transceiver and based on the transmission protocol of the second transceiver. For example, the second transceiver may be a Bluetooth transceiver, and may be granted access to the transmission medium based on Bluetooth transmission requests.

Returning to operation 604, if it is determined that a transceiver cannot be aligned with the QuietIE schedule, method 600 may proceed to operation 608 during which it may be determined if the QuietIE schedule may be aligned with a period of the transmission protocol of the second transceiver. For example, it may be determined if the QuietIE schedule may be aligned with a period of the second transceiver utilizing a Bluetooth protocol. Such a determination may be made based on one or more features or characteristics of the QuietIE schedule, such as a period or frequency, and a period of the transmission protocol of the second transceiver. If it is determined that the QuietIE schedule may be aligned with a period of the transmission protocol of the second transceiver, method 600 may proceed to operation 610.

During operation 610, the QuietIE schedule may be adjusted and implemented based on requests issued by the second transceiver. For example, the QuietIE schedule may be moved or adjusted based on requests issued by the second transceiver, which may be Bluetooth requests. In this way, adjustments may be made to the implementation of the QuietIE schedule to align the QuietIE schedule with such Bluetooth requests. As shown in FIG. 6, if such alignment is successful, as may be determined at operation 612, the second transceiver may be granted access to the transmission medium in accordance with such requests.

If such alignment is not successful, method 600 may proceed to operation 614 during which the second transceiver may be switched to a legacy coexistence technique. For example, the second transceiver may use CTS-to-Self frames or management frames to implement such coexistence, and such frames may be included with every transmission.

Returning to operation 608, if it is determined that the QuietIE schedule cannot be aligned with a period of the transmission protocol of the second transceiver, method 600 may proceed to operation 616 during which new QuietIE schedule may be generated. In various embodiments, this may include the generation of a QuietIE schedule request and/or the generation and distribution of a QuietIE schedule. In various embodiments, the QuietIE schedule may be generated based, at least in part, on features or characteristics of a transmission protocol of the second transceiver, such as a timing of requests issued in accordance with the transmission protocol of the second transceiver, such as Bluetooth requests.

If a QuietIE schedule is successfully generated, as determined in operation 618, method 600 may proceed to operation 606 during which the second transceiver may be granted access to the transmission medium based on requests issued by the second transceiver and based on the transmission protocol of the second transceiver. If a QuietIE schedule is not successfully generated, as determined in operation 618, method 600 may proceed to operation 614 during which the second transceiver may be switched to a legacy coexistence technique.

Returning to operation 602, if a QuietIE schedule is not available, method 600 may proceed to operation 616 as discussed above, and it may be determined if a QuietIE schedule may be generated.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying a plurality of wireless devices communicatively coupled to a first transceiver;
   generating, using a processing device, a medium access schedule for at least the first transceiver and the plurality of wireless devices based on a transmission parameter identifying one or more transmission times designated by a transmission protocol of a second transceiver, the second transceiver being collocated with the first transceiver and sharing a transmission medium with the first transceiver, and the medium access schedule comprising a QuietIE schedule; and
   transmitting the QuietIE schedule to the plurality of wireless devices, the QuietIE schedule identifying a plurality of quiet periods and a plurality of available periods to the plurality of wireless devices.

2. The method of claim 1, wherein each of the plurality of quiet periods identifies a period during which the first transceiver is not available to communicate with the plurality of wireless devices, and wherein each of the plurality of available periods identifies a period during which the first transceiver is available to communicate with the plurality of wireless devices.

3. The method of claim 1, wherein the first transceiver is a wireless local area network (WLAN) transceiver compatible with a Wi-Fi transmission protocol, wherein the second transceiver is a Bluetooth transceiver, and wherein the transmission parameter of the second transceiver identifies one or more parameters of a Bluetooth transmission protocol.

4. The method of claim 3, wherein the QuietIE schedule is generated based, at least in part, on Bluetooth sync events associated with the second transceiver.

5. The method of claim 3, wherein the first transceiver and the second transceiver operate on the same frequency band.

6. The method of claim 1 further comprising:
   generating, using the processing device, a first control signal to grant or deny transmission medium access to the first transceiver based, at least in part, on the QuietIE schedule; and
   generating, using the processing device, a second control signal to grant or deny transmission medium access to the second transceiver based, at least in part, on the QuietIE schedule.

7. The method of claim 1, wherein the QuietIE schedule is transmitted to the plurality of wireless devices in a beacon frame.

8. The method of claim 1, wherein the plurality of quiet periods and the plurality of available periods are determined based, at least in part, on a duty cycle of a transmission protocol of the second transceiver.

9. A device comprising:
   a first transceiver configured to transmit, using an antenna, data packets in accordance with a first transmission protocol;
   a second transceiver configured to transmit, using the antenna, data packets in accordance with a second transmission protocol; and
   a processing device configured to generate a medium access schedule for at least the first transceiver and a plurality of wireless devices communicatively coupled to the first transceiver based on a transmission parameter identifying one or more transmission times designated by a transmission protocol of the second transceiver, wherein the medium access schedule is a QuietIE schedule that identifies a plurality of quiet periods and a plurality of available periods that are determined based, at least in part, on the transmission parameter of the second transceiver.

10. The device of claim 9, wherein each of the plurality of quiet periods identifies a period during which the first transceiver is not available to communicate with a plurality of wireless devices, and wherein each of the plurality of available periods identifies a period during which the first transceiver is available to communicate with the plurality of wireless devices.

11. The device of claim 9, wherein the processing device comprises a packet traffic arbiter included in the first transceiver.

12. The device of claim 9, wherein the first transceiver is a wireless local area network (WLAN) transceiver compatible with a Wi-Fi transmission protocol, wherein the second transceiver is a Bluetooth transceiver, and wherein the transmission parameter of the second transceiver identifies one or more parameters of a Bluetooth transmission protocol.

13. The device of claim 12, wherein the plurality of quiet periods and the plurality of available periods of the QuietIE schedule are synchronized to Bluetooth sync events of the second transceiver.

14. The device of claim 9, wherein the processing device is further configured to:
   generate a first control signal to grant or deny transmission medium access to the first transceiver based, at least in part, on the QuietIE schedule; and
   generate a second control signal to grant or deny transmission medium access to the second transceiver based, at least in part, on the QuietIE schedule.

15. The device of claim 9, wherein the processing device is further configured to transmit the QuietIE schedule to a plurality of wireless devices, and wherein the QuietIE schedule is transmitted in a beacon frame.

16. A system comprising:
   an antenna configured to transmit wireless communications signals;
   a WLAN transceiver compatible with a Wi-Fi transmission protocol;
   a Bluetooth transceiver compatible with a Bluetooth transmission protocol;
   a processing device configured to generate a medium access schedule for the WLAN transceiver and a first plurality of devices based on a transmission parameter identifying one or more transmission times designated by a transmission protocol of the Bluetooth transceiver, wherein the medium access schedule comprises a QuietIE schedule that identifies a plurality of quiet periods and a plurality of available periods that are determined based, at least in part, on the transmission parameter of the Bluetooth transceiver;
   wherein, the first plurality of devices is configured to communicate with the WLAN transceiver; and
   a second plurality of devices configured to communicate with the Bluetooth transceiver.

17. The system of claim 16, wherein each of the plurality of quiet periods identifies a period during which the WLAN transceiver is not available to communicate with the first plurality of devices, and wherein each of the plurality of available periods identifies a period during which the WLAN transceiver is available to communicate with the first plurality of devices.

18. The system of claim 17, the plurality of quiet periods and the plurality of available periods of the QuietIE schedule are synchronized to Bluetooth sync events of the Bluetooth transceiver.

19. The system of claim 16, wherein the processing device is further configured to:
   generate a first control signal to grant or deny transmission medium access to the WLAN transceiver based, at least in part, on the QuietIE schedule;
   generate a second control signal to grant or deny transmission medium access to the Bluetooth transceiver based, at least in part, on the QuietIE schedule; and
   transmit the QuietIE schedule to the first plurality of devices in a beacon frame.

20. The system of claim 16, wherein the processing device is included in an access point.

* * * * *